No. 666,906. Patented Jan. 29, 1901.
H. PIERPOINT.
APPARATUS FOR DISPLAYING ADVERTISEMENTS, &c.
(Application filed July 24, 1899.)
(No Model.) 4 Sheets—Sheet 1.
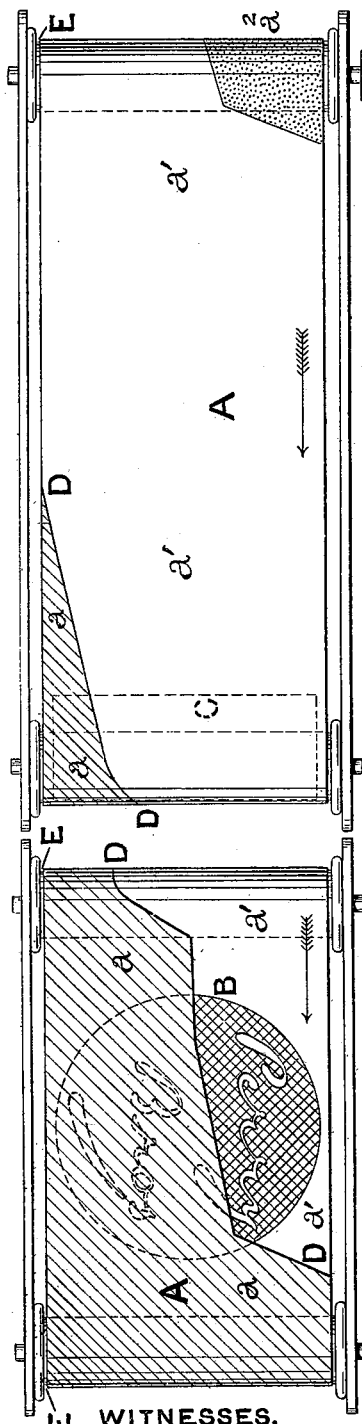
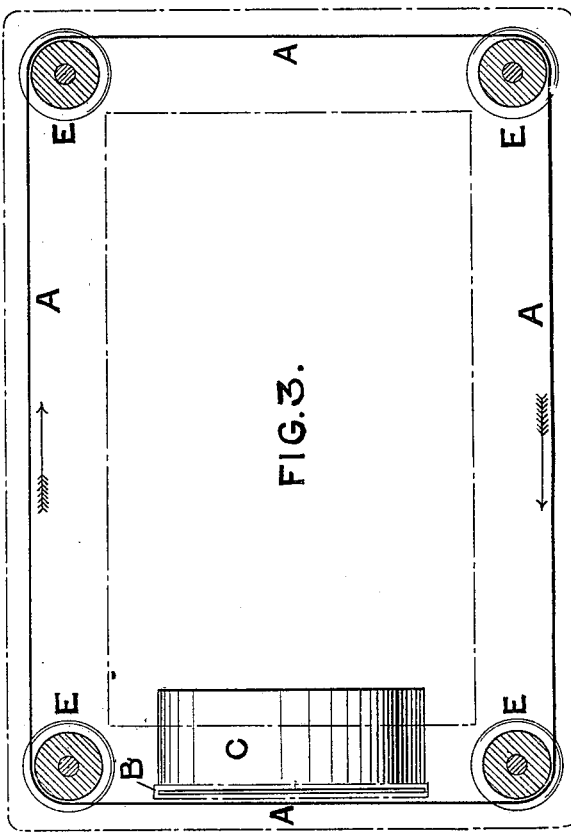
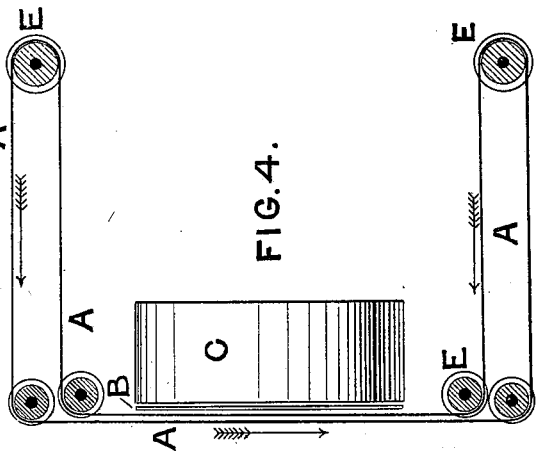
WITNESSES.
E. Howard.
Joseph Bates.
INVENTOR.
H. Pierpoint
by J. W. T. and O'Brien
atty.
THE NORRIS PETERS CO., PHOTO-LITHO., WASHINGTON, D. C.

No. 666,906. Patented Jan. 29, 1901.
H. PIERPOINT.
APPARATUS FOR DISPLAYING ADVERTISEMENTS, &c.
(Application filed July 24, 1899.)
(No Model.) 4 Sheets—Sheet 2.
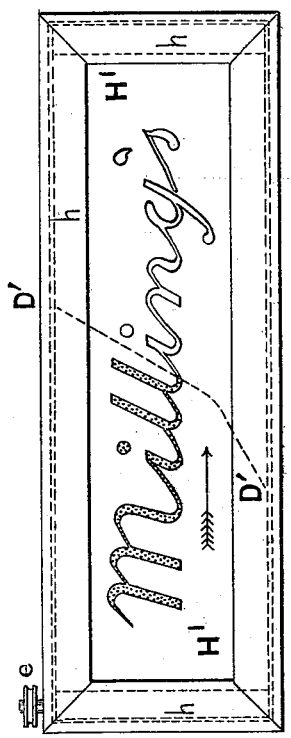
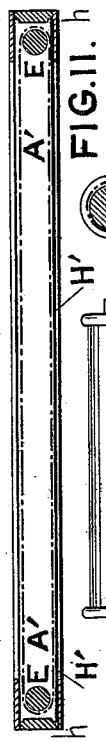
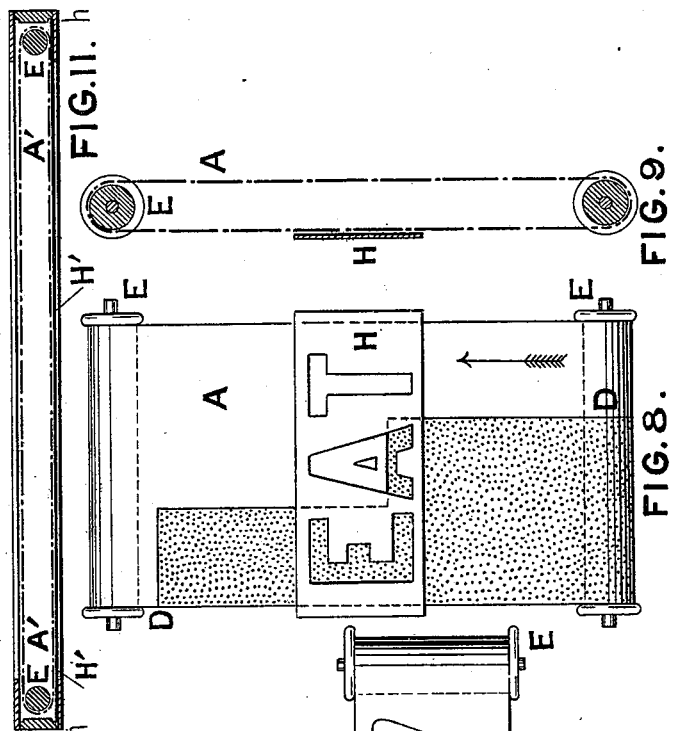
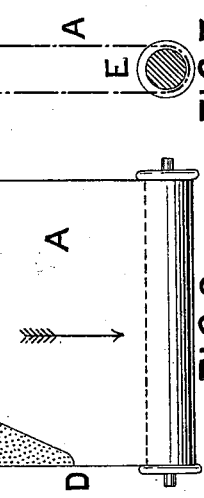
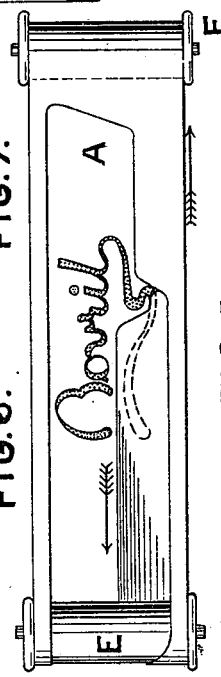
WITNESSES. INVENTOR No. 666,906. Patented Jan. 29, 1901.
H. PIERPOINT.
APPARATUS FOR DISPLAYING ADVERTISEMENTS, &c.
(Application filed July 24, 1899.)
(No Model.) 4 Sheets—Sheet 3.
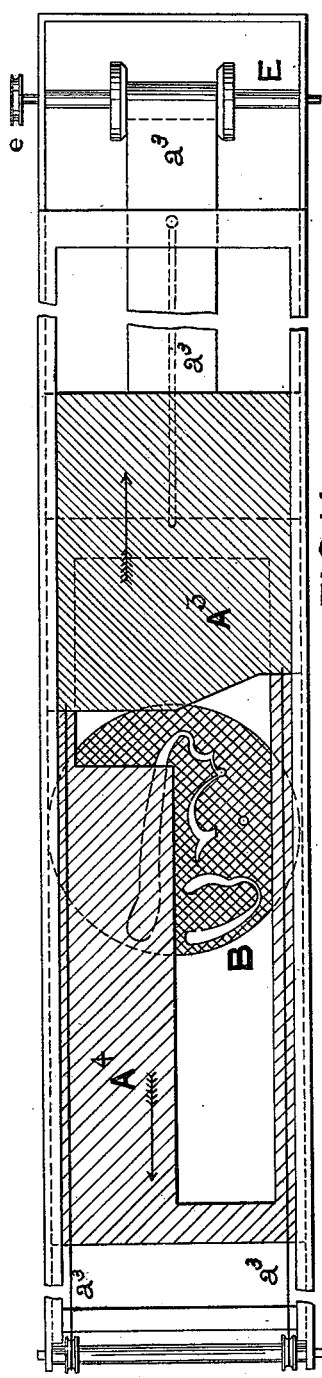
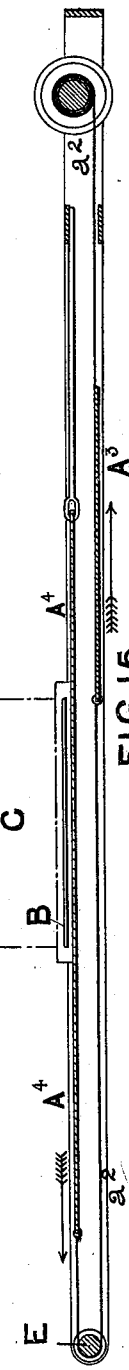
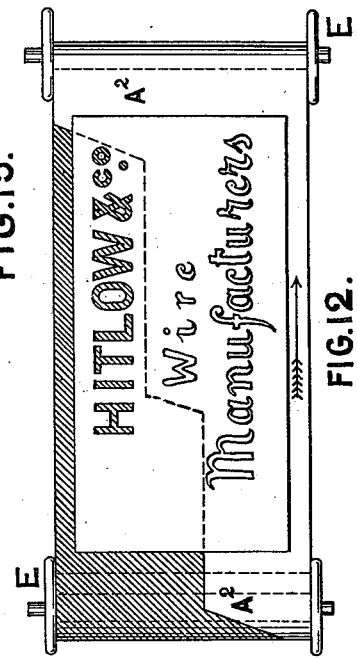
WITNESSES.
E. Howard.
Joseph Bates.
INVENTOR.
H. Pierpoint
by J. J. O'Brien
atty.

No. 666,906. Patented Jan. 29, 1901.
H. PIERPOINT.
APPARATUS FOR DISPLAYING ADVERTISEMENTS, &c.
(Application filed July 24, 1899.)
(No Model.) 4 Sheets—Sheet 4.

WITNESSES.
E. Howard.
Joseph Bates.

INVENTOR
H. Pierpoint
by L. Cowan O'Brien
atty.

UNITED STATES PATENT OFFICE.

HERBERT PIERPOINT, OF WARRINGTON, ENGLAND.

APPARATUS FOR DISPLAYING ADVERTISEMENTS, &c.

SPECIFICATION forming part of Letters Patent No. 666,906, dated January 29, 1901.

Application filed July 24, 1899. Serial No. 724,989. (No model.)

*To all whom it may concern:*

Be it known that I, HERBERT PIERPOINT, a subject of the Queen of Great Britain, residing at Warrington, in the county of Lancaster, England, have invented certain new and useful Improvements in Apparatus for Displaying Advertisements or other Images, of which the following is a specification.

This invention relates to optical or other apparatus designed for the purpose of exhibiting or displaying names or words forming advertisements upon a screen (or the like) progressively and then obscuring them.

The invention is applicable for displaying name advertisements.

As applied to a sign comprising one or more words each letter would be displayed progressively and then the full name or names preferably be suddenly obscured or its appearance progressively changed.

The invention will be fully described with reference to the accompanying drawings.

Figure 18:
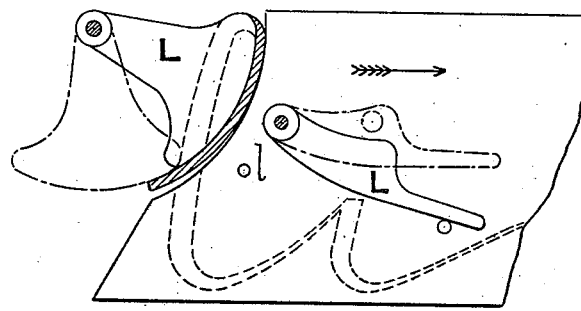
Figure 16:
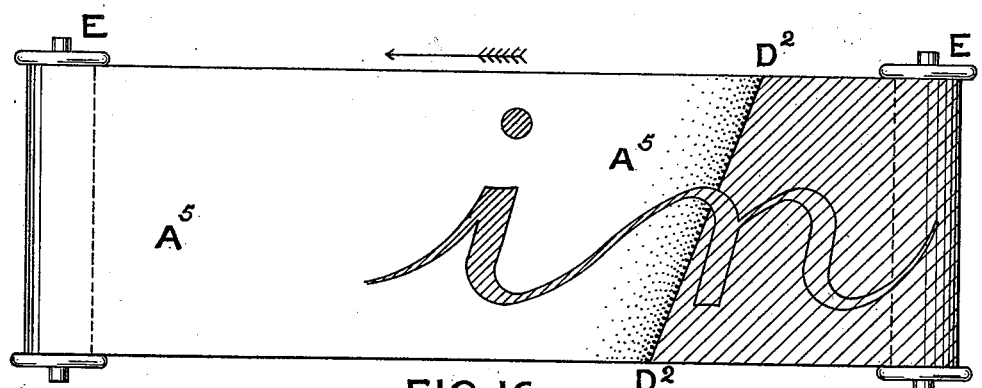
Figure 17:
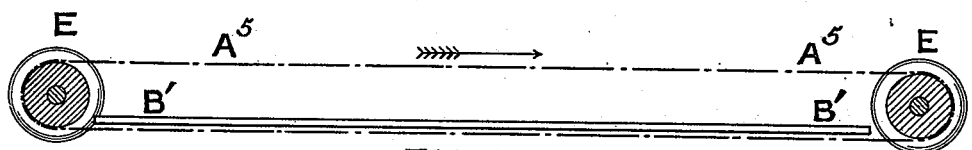

Figure 1 is a front elevation of one arrangement of the apparatus; Fig. 2, a side elevation of same; Fig. 3, a plan of Fig. 2; Fig. 4, a plan showing a modified arrangement with front and back of band traveling across the screen; Fig. 5, a front elevation showing the operation of the front and back of bands across the screen corresponding with Fig. 4; Fig. 6, a front elevation showing the endless band traveling in a vertical direction; Fig. 7, a sectional elevation of same, Fig. 6; Fig. 8, a front elevation showing arrangement for exhibiting printed letters successively; Fig. 9, a sectional elevation of same, Fig. 8; Fig. 10, a front elevation of a further modification in which an endless band of opaque, dark, or colored material is traversed across a screen with transparent letters therein; Fig. 11, a sectional plan of same, Fig. 10; Fig. 12, a front elevation of traveling band reciprocating between two rollers; Fig. 13, a sectional plan of same, Fig. 12; Fig. 14, a front elevation showing a modification with a reciprocating slide carried backward and forward by a band reciprocating between two rollers; Fig. 15, a sectional plan of same, Fig. 14; Fig. 16, a front elevation showing modified form of edge or cut-off; Fig. 17, a sectional plan of Fig. 16; Fig. 18, a front elevation of the device for successively forming the dots of the letter "i" and the loops of the letter "l;" Fig. 19, a front elevation of device for crossing "t's;" Fig. 20, another arrangement of appliance for forming dots, loops, and crosses of letters.

The invention may be carried out in various ways by means of a flexible band or a slide traveling past a screen with legible characters and formed with a stepped or inclined or serrated edge cut therein or formed thereon by different colors upon the material or by a band or slide in part opaque and in part transparent, the two parts being separated by a stepped inclined or serrated edge, or the screen containing the legible characters may travel past a fixed edge similarly shaped.

In Figs. 1, 2, 3, and 4 an endless traveling band A is caused to travel across the screen B, carrying the characters, which is placed in front of the condenser C of an ordinary optical lantern. The part $a$ of the band A is opaque, through which the light will not penetrate. The part $a'$ is either cut away or is transparent to permit of the letters being projected through, and the part $a^2$ of the band A may be either transparent and colored or opaque. The edge or line D D, dividing the opaque part $a$ from the transparent part $a'$, is stepped or inclined to successively expose as the band travels one letter or portion of a letter of the image and one line and then the next line. The contour or configuration of the line D D is formed or adapted to the letters to be exposed. A written name or word is preferred, and the letters are then progressively shown as if being written. When the part $a^2$ of the traveling band is transparent and colored, the effect is of one color writing out the preceding color of the letters. The band is mounted upon a number of rollers E, driven by a small pulley $e$ on the spindle of one of the rollers.

Both the front and back of the endless band A are carried in front of the screen B and condenser C, as shown in Figs. 4 and 5, the front of the band exposing and obscuring portions of the letters and the back of the band at the same time exposing and obscuring other portions of the letters. As an example, the front of the blind successively exposes or writes the letters of the name and the back of the blind exposes the dash or tail of the letter. The contrast may be heightened between any portions by the shading or graduating of the colors. Thus a transparent succession of different colors could be rendered gradually opaque by abrupt edge of transparent following color, which in its turn would gradually shade off to opacity.

The band may be caused or placed to travel vertically, as shown in Figs. 6 to 9, instead of horizontally, in which case the inclined edge D D will be cut at the proper angle to give the progressive effect desired. In Fig. 6 writing is illustrated, and in Fig. 8 the printing of the letters. In the arrangement shown in Figs. 6 to 9 the shaded portion of the band may either be opaque or colored and transparent and the lettering transparent or cut out of a fixed opaque screen H. The color of the traveling band shows up the letters as it passes behind the screen. These Figs. 6 to 9 can be illuminated, in which case the band could be transparent with different colors or transparent with opaque portions. The same apparatus is also suitable for a non-illuminated and an illuminated effect by suitable colors and opaque and transparent portions on the band. Thus a transparent ruby portion of band would show as dark color through the transparent portion of the letters when not illuminated and the other portion of the band the same color as the screen H is—say white opaque. Hence the oncoming of the dark color (ruby) would render effect. A light being placed behind the band, the opaque (white) portion would obscure and the transparent ruby portion would appear as bright red. The same arrangement is shown horizontally in Figs. 10 and 11, the lettering being transparent or cut out of a fixed opaque screen H', set in a suitable frame $h$, and an endless band A' traveling behind it, divided into different colors by the line D' D', which progressively changes the color or appearance of the letters with writing effect.

Instead of the traveling band being endless a traveling band $A^2$ may be employed, one end attached to one roller and the other end attached to another roller, and be drawn or reciprocated backward and forward between the two rollers, as in Figs. 12 and 13, the same effects being produced as above described.

In another modification reciprocating rigid bands may be employed, attached at both ends to flexible strips $a^3$, which are attached to or passed around rollers to which a reciprocating movement is given. This arrangement is shown in Figs. 14 and 15, in which two such reciprocating bands $A^3$ and $A^4$ are shown to be reciprocated in front of a lettered screen and a lens-condenser C. The front band $A^3$ exposes one part of the writing and the back slide the other part of the writing in the reverse direction, the effect being similar to that illustrated in Fig. 5.

A flowing appearance, as of the ink flowing into or through the writing, may be given by gradually shading off the screen B' from the line or edge $D^2$ to $D^2$, as shown in Figs. 16 and 17. In this case an endless transparent band $A^5$ travels from right to left inscribed with black or opaque characters or letters with a stationary screen B', a portion of which is black and a portion white, the line or edge between the black and white being formed, as before described, to give the effect of progression, as shown in Figs. 16 and 17. The effect produced is that of a flowing of the ink or writing on moving paper. This band $A^5$ may be transparent with transparent colored characters, opaque with transparent or perforated characters, or transparent with opaque characters.

Figure 19:
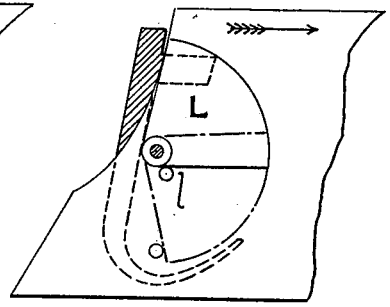
Figure 20:
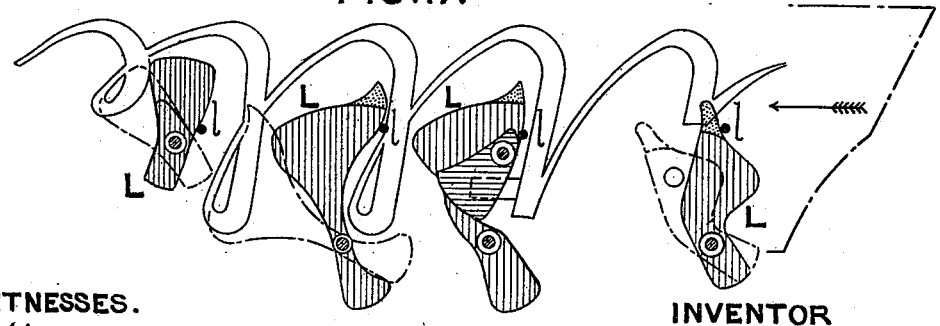

For the forming of loops upon letters, the dotting of certain letters, and crossing of others pivoted levers or tumblers L may be employed, (see Figs. 18, 19, and 20,) which are pivoted so that the traveling band will pass them. These tumblers are weighted or hung to fall by gravity and are lifted by a pin $l$, attached to or carried by the traveling band, which successively raises one to obscure the loop, dot, or cross and allows it to drop at the proper moment to expose it. Figs. 18 and 19 show the arrangement for one class of letters and Fig. 20 the arrangement for reversed letters.

What I claim as my invention, and desire to protect by Letters Patent, is—

1. An optical device for displaying names in which each letter is progressively displayed comprising in its construction a traveling band provided with a shaped dividing edge between opaque, colored, and transparent portions, correlatively shaped in respect to the form of the letters at an angle between that of the up and down strokes in combination with a screen having legible characters to give the effect of progressive writing substantially as described.

2. In an optical device for displaying names the combination with a lettered screen carrying the name, of a traveling band provided with a shaped dividing-line at an angle of inclination between that of the up and down strokes of the letters to progressively display them, and rollers over which the band is caused to travel substantially as described.

In witness whereof I have hereunto signed my name in the presence of two subscribing witnesses.

HERBERT PIERPOINT.

Witnesses:
J. OWDEN O'BRIEN,
B. LATHAM WOODHEAD.